No. 751,360. PATENTED FEB. 2, 1904.
A. L. TENNEY.
FREEZING AND BRICKING APPARATUS.
APPLICATION FILED AUG. 15, 1902.
NO MODEL.
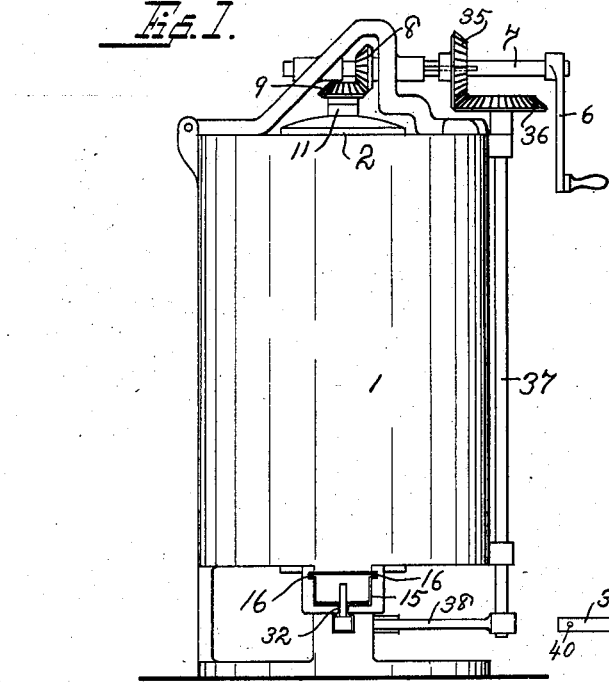
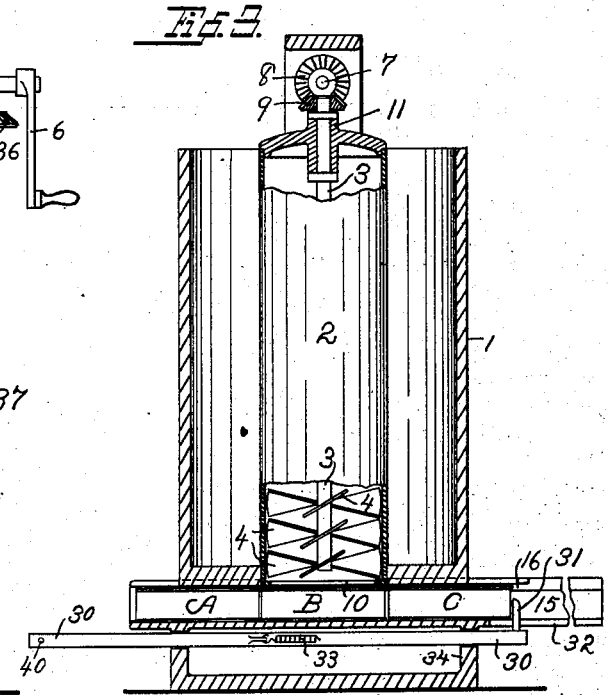
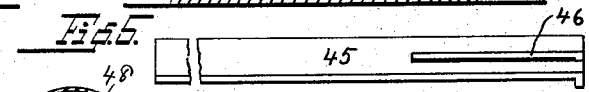
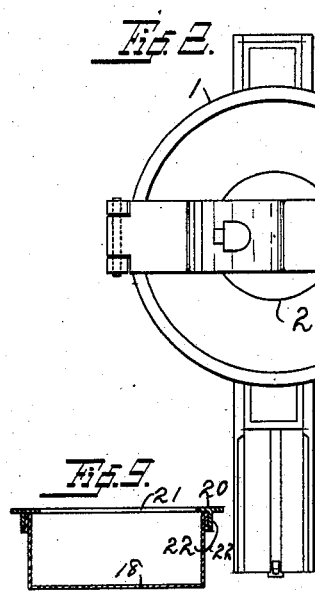
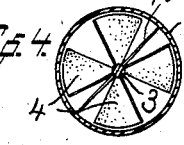
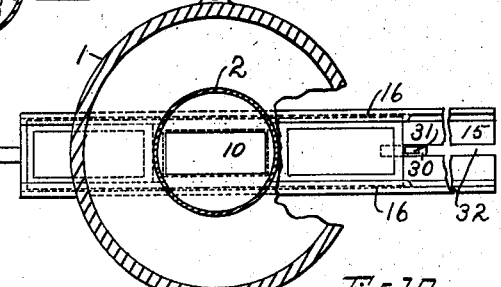
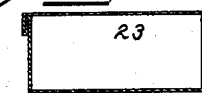
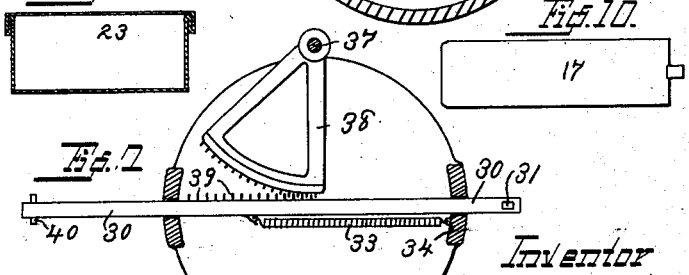
Witnesses:
Inventor
Alva L. Tenney
By Erwin & Wheeler
Attorneys.
THE NORRIS PETERS CO., PHOTO-LITHO., WASHINGTON, D. C.

No. 751,360. Patented February 2, 1904.

UNITED STATES PATENT OFFICE.

ALVA L. TENNEY, OF HARTLAND, WISCONSIN.

FREEZING AND BRICKING APPARATUS.

SPECIFICATION forming part of Letters Patent No. 751,360, dated February 2, 1904.

Application filed August 15, 1902. Serial No. 119,706. (No model.)

*To all whom it may concern:*

Be it known that I, ALVA L. TENNEY, a citizen of the United States, residing at Hartland, county of Waukesha, and State of Wisconsin, have invented new and useful Improvements in Freezing and Bricking Apparatus, of which the following is a specification.

My invention relates to improvements in freezing and bricking apparatus, such as are used for freezing ice-cream and similar materials.

The object of my invention is to provide means whereby the cream may not only be frozen, but may be packed in the bricking-receptacles through the medium of a single apparatus.

In the following description reference is had to the accompanying drawings, in which—

Figure 1 is a front view of my invention. Fig. 2 is a top view of the same. Fig. 3 is a vertical sectional view drawn longitudinally of the trough for the bricking-receptacles. Fig. 4 is a cross-sectional view of the cream-chamber of the freezer. Fig. 5 is a perspective view of a removable plate for insertion in the trough for the bricking-receptacles. Fig. 6 is a detail view of the bricking-receptacles and their supporting-trough, showing the ice and cream chambers and their relative positions. Fig. 7 is a detail plan view of the lower portion of the mechanism for advancing the bricking-receptacles. Fig. 8 is an enlarged cross-sectional view of the bricking-receptacle with the cover applied. Fig. 9 is a cross-sectional view of the same with the slide applied in place of the cover, and Fig. 10 is a plan of the slide used when freezing the cream.

Like parts are identified by the same reference characters throughout the several views.

1 represents the ice-chamber; 2, a stationary freezing-chamber located therein.

3 is the agitator-shaft, provided with wings 4, formed with an angular pitch, as shown, whereby when the freezer is in operation for freezing the cream the latter is continuously lifted by the wings during their revolution. Motion is communicated to the shaft and wings from a handle 6 through a shaft 7 and beveled gear-wheels 8 and 9. These parts are all of ordinary construction, except that the cream-chamber 2 is provided with an opening 10 in the bottom, and an elongated bearing 11 is provided for the shaft 3 at the upper end of the chamber 2, whereby the bearing at the lower end of said shaft may be dispensed with.

Underneath the freezer I have provided a trough 15 for the bricking-receptacles, which consists of rectangular boxes 18. This trough extends underneath the aperture 10 in the bottom of the cream-chamber 2 and is provided with side channels 16 for the reception of a slide 17, which constitutes a valve and which when inserted in the channels 16 and moved into registry with the aperture 10 will close said aperture and prevent the escape of cream from the chamber 2. Preparatory to freezing the cream this slide 17 is adjusted to close the opening 10; but after the cream is frozen the slide is removed, whereupon the boxes 18 are passed successively underneath the aperture 10 and the motion of the shaft 3 and wings 4 is reversed to force the frozen cream downwardly into the bricking-receptacles, filling them in succession.

To prevent the escape of the material over the edges of the receptacles 18, I have provided a skeleton slide 20, having a central aperture 21 and downwardly-extending flanges 22, the slide being adapted to fit the receptacle 18 in the same manner as the cover 23. (Shown in Fig. 8.) The side edges of the slide project beyond the flanges 22, as shown in Fig. 9, and are adapted to fit in the channels 16 of the trough.

The receptacles 18 are fed longitudinally through the trough step by step, this being accomplished by means of a reciprocating bar 30, provided with a follower 31, which projects from the bar 30 upwardly through a slot 32 in the bottom of the trough 15 at the front end thereof. The bar 30 is normally held in its forward position by means of a spring 33 connecting it with the base 34 of the machine. A rearward motion is intermittently communicated to the bar 30 from the driving-shaft 7 through the medium of the bevel gear-wheels 35 and 36, shaft 37, sector-gear 38, and rack-teeth 39, the latter being located on the bar 30. The sector-gear 38 is of such dimensions as to push the bar rearwardly a distance equal to the length of one of the bricking-receptacles 18, when as the teeth of the sector pass out of engagement with the rack-teeth 39 the reaction of the spring 33 restores the bar 30 to its normal position, where it remains until the revolution of the sector 38 again brings it into engagement with the teeth 39. A stop 40 is used to limit the movement of the bar 30.

In operation, the slide 17 being in position to close the aperture 10 in the bottom of the chamber 2, the cream is frozen in the usual manner. The slide 17 is then removed and the box provided with one of the skeleton slides 20 is inserted in position, with the aperture 20 reciprocating with the aperture 10 in the chamber 2. Two additional boxes are then inserted in the forward end of the trough 15 between the follower 31 and the box under the chamber 2. The boxes are so adjusted when the sector 38 is in the final position of release from the rack-teeth 39. The crank 6 is then turned in a direction opposite that in which it is turned for freezing the cream, whereupon the wings 4 will force the frozen cream downwardly through the aperture 10 into the box in registry therewith. The driving mechanism is so arranged that sufficient time will elapse for the box to become filled before the sector 38 completes its movement and engages the rack-teeth 39. The bar 30 will then be pushed rearwardly by the sector, whereupon the follower 31 pushes the front box inwardly until the filled box is pushed to the position indicated at A in Fig. 3, when the box at B will be in registry with the aperture 10 and the box at C will have moved inwardly a distance equal to its own length. The sector 38 then releases bar 30, which is then retracted by the spring 33 to permit the insertion of another box in the front end of the trough 15 between the follower 31 and the box at C. The filled box at A is then removed and the cover 23 substituted for the slide 20.

It will of course be understood that while the machine, as illustrated, is manually controlled, any form of power may be used to drive the same, and where sufficient power is available the chambers 1 and 2 may be made of a considerable height, affording capacity for a large quantity of cream.

Where boxes of different heights are used, I provide the trough 15 with a false bottom 45, having a slot 46 corresponding with the slot 32 in the bottom of the trough. By inserting one or more of these false bottoms in the trough I am enabled to adjust the trough for boxes of any desired height. The same result may be accomplished, if desired, by making the bottom of the trough adjustable. Where the boxes are of different widths and lengths, the outside dimensions of the slides 20 are the same in all cases; but the flanges 22 are adapted to fit the edges of the respective boxes. The central apertures 21 are formed to correspond with the size of the box used.

I do not limit the scope of my invention to include any specific style of freezing apparatus, although the particular form of construction shown and described is preferred, owing to the fact that the wings 4 may be conveniently utilized to force the freezing cream into the boxes, but any other suitable mechanism either manually or automatically operated may be substituted, if desired, as the agitators of nearly all ice-cream freezers are made removable.

Having thus described my invention, what I claim as new, and desire to secure by Letters Patent, is—

1. In a freezer of the described class, a freezing-chamber having an opening in its lower portion; a valve normally closing said opening; a receiving-receptacle movable transversely of the opening, and having walls movable upon the valve-seat, in substitution for the valve.

2. In a freezer of the described class, a freezing-chamber having an opening in its lower portion; a valve normally closing said opening; a support for receiving-receptacles adjacent to said opening; and apertured devices fitting said receptacles, and adapted to move upon the valve-seat in substitution for the valve when the receptacles are being filled.

3. In a freezer of the described class, a freezing-chamber having an opening in its lower portion; a valve normally closing said opening; a supporting-way extending transversely of said opening; and receiving-receptacles adapted to move along said way, and having walls arranged to move in sliding contact with the walls of the opening in the freezing-chamber, and arranged to fit such walls to form a closed passage from the freezing-chamber into the receiving-receptacle.

4. The combination of a freezer of the described class, provided with an opening in the lower portion of the freezing-chamber; a way for receiving and bricking receptacles, adapted to support such receptacles in registry with the aperture; a valve for closing the aperture during the freezing operation; and an apertured device, fitting the receiving-receptacles, and adapted to be substituted for the valve when the receptacles are in registry with the aperture in the freezing-chamber, said device being adapted to prevent the escape of the material over the edges of the receiving-receptacle; and means for forcing the material from the receiving-chamber.

5. The combination of a freezer of the described class, provided with an opening in the lower portion of the freezing-chamber; a way for receiving and bricking receptacles, adapted to support such receptacles in registry with the aperture; a valve for closing the aperture during the freezing operation; an apertured device, fitting the receiving-receptacles, and adapted to be substituted for the valve when the receptacles are in registry with the aperture in the freezing-chamber, said device being adapted to prevent the escape of the material over the edges of the receiving-receptacle; mechanism operatively connected with the driving mechanism of the freezer, for advancing the bricking-receptacles step by step along said way; and means for forcing the material from the receiving-chamber.

6. The combination of a freezer of the described class, provided with an aperture in the lower portion of the freezing-chamber; a way for receiving and bricking receptacles, extending past said aperture; a valve controlling the passage of material through the aperture; a follower adapted to push bricking-receptacles along said way; and mechanism connected with the driving mechanism of the freezer for reciprocating the follower.

7. The combination of a freezer of the described class, provided with an aperture in the lower portion of the freezing-chamber; a way for receiving and bricking receptacles, extending past said aperture; a valve controlling the passage of material through the aperture; a follower adapted to push bricking-receptacles along said way; and mechanism connected with the driving mechanism of the freezer for reciprocating the follower; together with an agitator located in the freezing-chamber and provided with inclined wings, adapted to force the material longitudinally.

8. The combination of a freezer of the described class, provided with an aperture in the lower portion of the freezing-chamber; a way for receiving and bricking receptacles, extending past said aperture; a valve controlling the passage of material through the aperture; a follower adapted to push bricking-receptacles along said way; and mechanism connected with the driving mechanism of the freezer for reciprocating the follower; together with an agitator located in the freezing-chamber and provided with inclined wings, adapted to force the material longitudinally; said agitator being supported by suitable bearings at the upper end of the receiving-chamber, and without bearings at its lower end.

9. The combination of a freezer of the described class, provided with an aperture in the lower portion of the freezing-chamber, and provided with side channels; a valve controlling the passage of material through said opening, adapted to slide in said channels; a set of bricking-receptacles adapted to slide in said way; and apertured covers for said receptacles, provided with side flanges adapted to engage in said channels.

10. In a freezer of the described class, a freezing-chamber having an opening in its lower portion; a valve normally closing said opening; and a traveling slide, adjustable transversely of the opening in substitution for the valve; said slide being provided with an aperture and adapted to serve as a cover for the receiving-receptacle.

In testimony whereof I affix my signature in the presence of two witnesses.

ALVA L. TENNEY.

Witnesses:
LYMAN G. WHEELER,
LEVERETT C. WHEELER.